(12) United States Patent
Lin et al.

(10) Patent No.: US 11,799,975 B1
(45) Date of Patent: Oct. 24, 2023

(54) SYSTEM AND METHOD FOR PATTERN DETECTION IN USER ACCOUNTS THROUGH FUZZY PATTERN MATCHING

(71) Applicant: PayPal, Inc., San Jose, CA (US)

(72) Inventors: Ying Lin, Shanghai (CN); Jiaqi Zhang, Shanghai (CN)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 17/662,155

(22) Filed: May 5, 2022

(51) Int. Cl.
*H04L 67/306* (2022.01)
*G06N 5/048* (2023.01)
*G06F 18/20* (2023.01)

(52) U.S. Cl.
CPC ............ *H04L 67/306* (2013.01); *G06F 18/29* (2023.01); *G06N 5/048* (2013.01)

(58) Field of Classification Search
CPC ..... H04L 51/212; H04L 63/145; G06Q 40/02; G06Q 30/0185; H04W 12/122
See application file for complete search history.

(56) References Cited

U.S. PATENT DOCUMENTS

| | | | |
|---|---|---|---|
| 2012/0246720 A1* | 9/2012 | Xie | H04L 51/212 726/22 |
| 2016/0364794 A1* | 12/2016 | Chari | G06Q 40/02 |
| 2017/0178139 A1* | 6/2017 | Gieseke | G06Q 30/0185 |
| 2019/0220863 A1* | 7/2019 | Novick | G06Q 20/10 |

* cited by examiner

*Primary Examiner* — Mahran Y Abu Roumi
(74) *Attorney, Agent, or Firm* — Kowert, Hood, Munyon, Rankin & Goetzel, P.C.; Gareth M. Sampson; Dean M. Munyon

(57) ABSTRACT

Various techniques are disclosed for providing dynamic, real-time pattern detection and linking between newly created user accounts and existing user accounts. Certain solutions include assessing matches of a new user account to nodes in a graphical representation of a machine learning algorithm based on predefined patterns in the properties of the new user account. The nodes in the graphical representation may each have different predefined patterns that have been determined based on patterns in previous information for user accounts, which can also be updated in real-time as needed. Accordingly, when a new user account is matched (e.g., assigned) to a node that has accounts with known issues associated with the node, the new user account may be flagged for increased scrutiny or other solutions.

18 Claims, 9 Drawing Sheets

US 11,799,975 B1

SYSTEM AND METHOD FOR PATTERN DETECTION IN USER ACCOUNTS THROUGH FUZZY PATTERN MATCHING

BACKGROUND

Technical Field

This disclosure relates generally to implementing graphical machine learning algorithms for detecting patterns in user accounts being established in a service system, including methods of matching user account properties to graphical nodes with predefined patterns, according to various embodiments.

Description of the Related Art

Linking between newly created user accounts and existing accounts may be utilized to determine whether the newly created user accounts have some issue associated with the account (e.g., a risk of being fraudulent or malicious). For instance, in fraud risk, a newly created user account may be linked to known existing fraudulent accounts and thus be subjected to increased scrutiny based on this association. Fraudulent or malicious parties, however, continually attempt to develop techniques to avoid direct linking between newly created fraudulent accounts and existing fraudulent accounts. Applicant recognizes that detecting patterns in newly created user accounts and linking the newly created user accounts to existing user accounts can be improved and provides solutions discussed herein.

Figure 1:
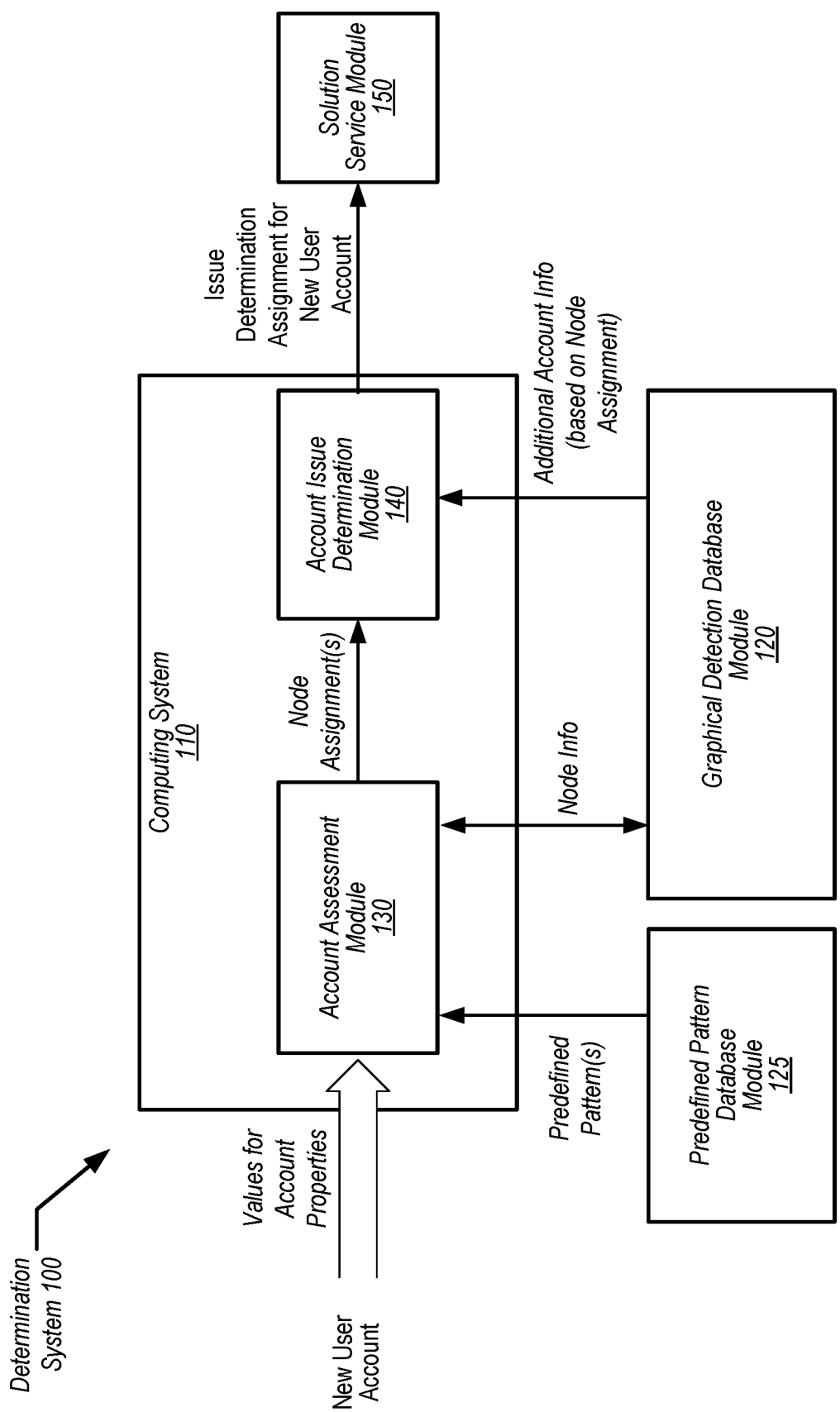
FIG. 1 is a block diagram of a potential account issue determination system, according to some embodiments.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Reciting in the appended claims that an element is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z). In some situations, the context of use of the term "or" may show that it is being used in an exclusive sense, e.g., where "select one of x, y, or z" means that only one of x, y, and z are selected in that example.

In the following description, numerous specific details are set forth to provide a thorough understanding of the disclosed embodiments. One having ordinary skill in the art, however, should recognize that aspects of disclosed embodiments might be practiced without these specific details. In some instances, well-known, structures, computer program instructions, and techniques have not been shown in detail to avoid obscuring the disclosed embodiments.

DETAILED DESCRIPTION

The present disclosure is directed to various techniques related to detection of patterns in new user accounts being established in a service system (e.g., a "service computer system"). As used herein, the terms "service computer system" or "service system" refer to any online system that implements a service in which two or more parties use computer systems to exchange information. Examples of online systems include, but are not limited to, payment processing systems, transaction processing systems, social network systems, file transfer systems, online retailer systems, dating site systems, and customer service systems. Accordingly, a "service" according to this disclosure may include a transaction service, a payment service (e.g., PAY-PAL), a social network, a file transfer service, an online retailer, a dating site, and so on. Note that generally, this disclosure may include various examples and discussion of techniques and structures within the context of a "service computer system" or "service system." Note that all these examples, techniques, and structures are generally applicable to any online system that allows access and the exchange of information to provide services to a user. For example, a service computer system may be any online system in some instances. However, the term service computer system is used for ease of understanding in various portions of this disclosure.

For pattern detection in service systems when a new user account is established, it is helpful to detect information that may link the new user account to other accounts. Information that may link accounts (e.g., "linking information") may include, for example, IP address, machine identification, email address, bank account information, username, etc. For instance, a single IP address can share multiple accounts or the email address for several accounts may have similar information. Such accounts may come from different customers, from a single customer, or from a group of similar accounts (e.g., a family or a collection of fraudsters). Pattern detection in new user accounts may be useful for providing various solutions for issues with accounts in service systems. Pattern detection in new user accounts may be useful, for instance, in determining fraud risk issues associated with new user accounts, in detecting collusion issues associated with new user accounts, or in determining dispute issues associated with new user accounts.

When a link is shared between a group of accounts and an account with known issues, the link (e.g., direct asset link) may support a projection that accounts in the group may be related to the same issue. If, however, the link is shared by many different users, this type of issue propagation may not work. Typically, the linking information described above is fed into a machine learning algorithm or other artificial intelligence model to detect accounts suspected of issues (e.g., fraud). Recently, malicious parties have developed more sophisticated strategies in attempts to bypass this type of issue detection. For instance, malicious parties have developed mechanisms to avoid creating obvious links between accounts.

In view of the increased sophistication of malicious parties, the present disclosure contemplates various techniques for detecting patterns in new user accounts by implementing fuzzy pattern matching for new user accounts established in a service system. As used herein, "fuzzy pattern matching" refers to a machine learning algorithm that matches accounts based on recognition of various patterns in information associated with the accounts. For example, fuzzy pattern matching may include recognizing patterns in email addresses such as email addresses for multiple accounts having the same prefix or recognizing a pattern that multiple accounts have IP geographic locations within a certain distance of each other. Fuzzy pattern matching may be implemented to recognize these patterns to provide a more sophisticated approach to detecting patterns in new user accounts and linking new user accounts based on these detected patterns. Fuzzy pattern matching is, however, a more intensive approach that involves greater data loads and more complicated computing. Accordingly, fuzzy pattern matching may be too complicated for real-time environment implementation such as is possible with direct asset linking (described above). Fuzzy pattern matching may be implemented offline (e.g., after accounts are established) but this may be too late to prevent fraudulent events from happening or for detecting other issues in the new accounts.

The present disclosure contemplates various techniques to implement fuzzy pattern matching in a real-time environment (e.g., dynamically). Matching based on fuzzy patterns in account information may allow a new user account to be linked (e.g., assigned) to a node associated with the predefined "fuzzy" pattern (e.g., a "fuzzy node" or pattern node, as described herein). Accordingly, if the node linked to the account includes other known accounts with issues (e.g., existing fraudulent, risk-associated accounts or colluding accounts), the new account may then be assigned a corresponding potential account issue determination (e.g., potential risk determination) based on its link to the node. As used herein, the term "potential account issue determination" refers to a determination that a user account may have an issue that could impact individuals, assets, or the computing environment associated with a service system. For example, in fraud risk, the potential account issue determination may be a fraud risk determination that indicates a user account may have the potential to negatively impact individuals, assets, or the computing environment associated with a service system.

After the new account is assigned with the potential account issue determination, further evaluation or monitoring of the new account may be implemented. For instance, the new account and its information may be referred to a solution service. As used herein, the term "solution service" refers to any service that attempts to solve or resolve issues or potential issues with customer accounts in a service system. For example, a solution service may be, but not be limited to, a fraud risk solution service to determine fraud risks, a collusion detection service to detect collusion attempts, or a dispute resolution service to resolve disputes between accounts. As further example, in fraud risk determination, when a link is shared between a group of accounts and a known fraudulent account, the link may support a projection that accounts in the group have an increased risk of fraud. Accordingly, the new account and its information may be referred to a solution service that determines fraud risk for user accounts. In the case of collusion detection, the new account and its information may be referred to a solution service that determines whether user accounts are colluding. In dispute resolution, the new account and its information may be referred to a solution service that attempts to resolve disputes between accounts.

One embodiment described herein has two broad components: 1) assessing values for account properties for a new user account generated for a service system to determine whether the new user account belongs to a node within a graphical detection database where the node has a predefined pattern (e.g., a "fuzzy" pattern) in the account properties, and 2) assigning an account issue determination to the new user account based on its association with other user accounts when the new user account belongs to the node. As used herein, the term "graphical detection database" refers to a graphical logic representation of data for pattern detection that includes nodes and edges (e.g., branches) defining pathways between the nodes. In certain embodiments, a graphical detection database uses nodes to represent entities and edges to represent relationships between the entities. Nodes may have one or more labels and hold (e.g., store) values for various properties associated with the labels. Edges may describe relationships such as parent-child relationships, actions, ownership, etc. between the nodes.

In various embodiments, assessing the values for the account properties includes determining whether patterns or combinations of patterns exist in values for account properties of the new user account. For instance, patterns or combinations of patterns in values may be assessed within account properties such as identification number, new user account creation time, email address, first name, last name, country, customer type, internet protocol address, phone number, zip code, credit card information, etc. to determine whether the account properties have the predefined pattern associated a node in the graphical detection database. In various embodiments, the predefined pattern is determined from previous information associated with user accounts though embodiments may be contemplated where the predefined pattern can be updated in real-time.

FIG. 1 is a block diagram of a potential account issue determination system, according to some embodiments. In certain embodiments, determination system 100 is implemented in a service system to determine potential issues in user accounts, as described herein. For instance, determination system 100 may be implemented in a service system (such as PayPal®) to make determinations of fraud risks, detect collusion, or determine disputes for user accounts associated with the service system. In the illustrated embodiment, determination system 100 includes computing system 110, graphical detection database module 120, and predefined pattern database module 125. As used herein, the term "computing system" refers to any computer system having one or more interconnected computing devices. Note that generally, this disclosure may include various examples and discussion of techniques and structures within the context of a "computer system." Note that all these examples, techniques, and structures are generally applicable to any computing system that provides computer functionality. The various components of computing system 110 (e.g., computing devices) may be interconnected. For instance, the components may be connected via a local area network (LAN). In some embodiments, the components may be connected over a wide-area network (WAN) such as the Internet.

Figure 4:
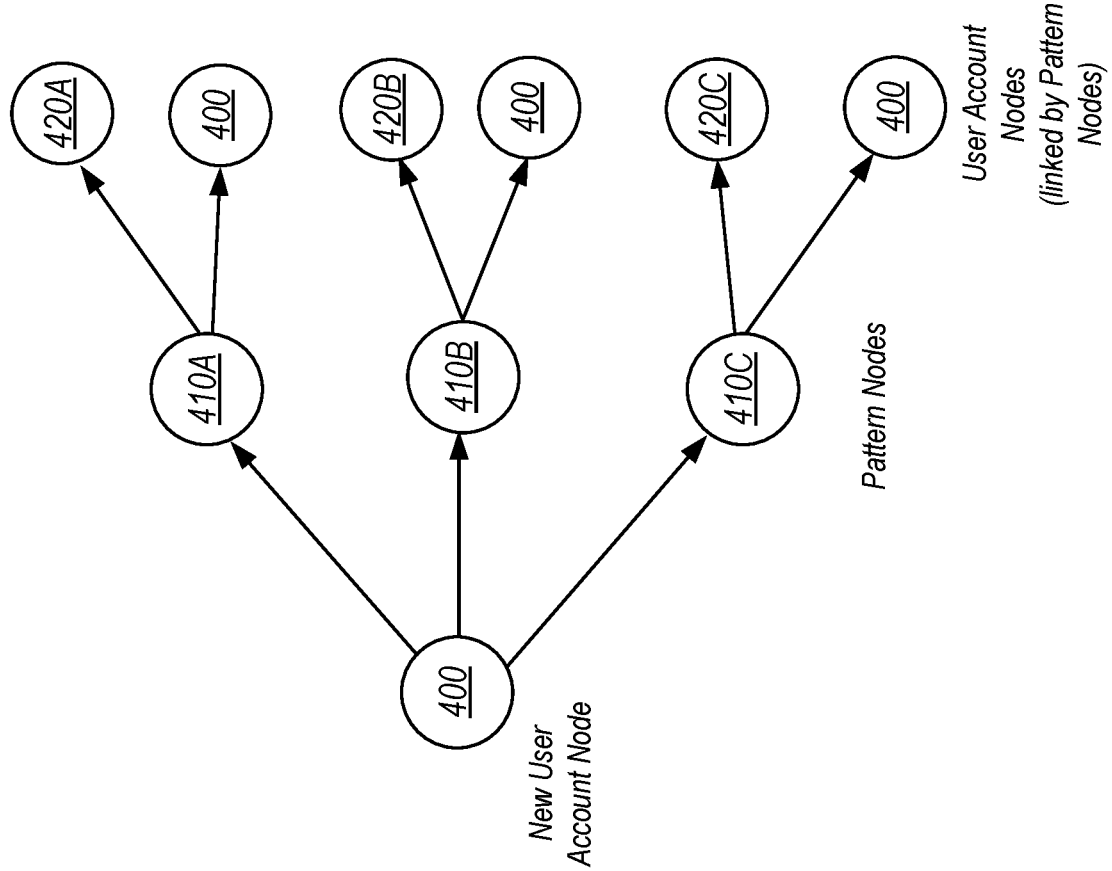
FIG. 4 depicts one example of addition of a new user account to a graph database, according to some embodiments.
Figure 5:
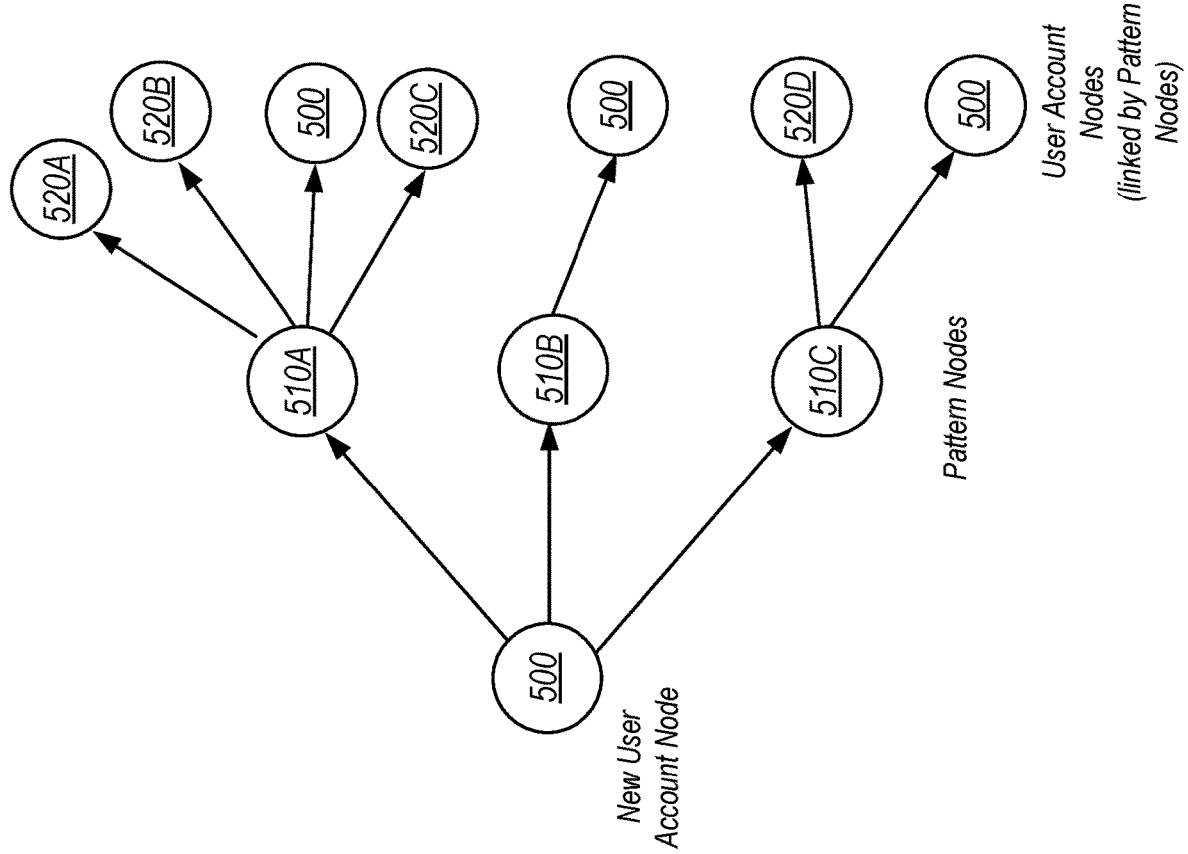
FIG. 5 depicts another example of addition of a new user account to a graph database, according to some embodiments.

In certain embodiments, graphical detection database module 120 is a graph database that stores and queries connected data for pattern detection in a node-and-relationships format. For instance, a graph database may store information as a graphical representation of nodes (e.g., vertices) interconnected by edges (e.g., branches). The graphical representation may then be queried according to the nodes and edges to retrieve information from the database. In the graph database, nodes represent entities while edges represent the pathways (e.g., relationships) between the entities. Examples of nodes and edges in a graph database are shown in FIGS. 4 and 5, which are described in more detail below. In some embodiments, graphical detection database module 120 is implemented by a computing system independent of computing system 110. In other embodiments, computing system 110 and graphical detection database module 120 are implemented together as part of a centralized or localized computing system.

In various embodiments, predefined pattern database module 125 is a database storing predefined patterns that are accessed by computing system 110. For instance, predefined pattern database module 125 may store one or more files having data for predefined patterns that are accessed by computing system 110. In some embodiments, predefined pattern database module 125 is implemented by a computing system independent of computing system 110. In other embodiments, predefined pattern database module 125 is implemented as part of computing system 110.

In the illustrated embodiment of FIG. 1, computing system 110 includes account assessment module 130 and account issue determination module 140. In certain embodiments, account assessment module 130 receives account information (including values for account properties) for a new user account being added to the service system associated with determination system 100. For example, new user account information may be provided to account assessment module 130 when a new user account is generated or otherwise created for the service system. Additional embodiments may be contemplated where existing user account information is provided to account assessment module 130 in determination system 100. For instance, existing user account information may be provided to account assessment module 130 for a random or routine assessment of existing accounts or to generate data for a subsequent account issue determination processes. Examples of account properties with values that may be included with the new user account include, but are not limited to, account/user identification number, new user account creation time, email address, first name, last name, country, customer type, internet protocol address, phone number, and zip code.

Figure 2:
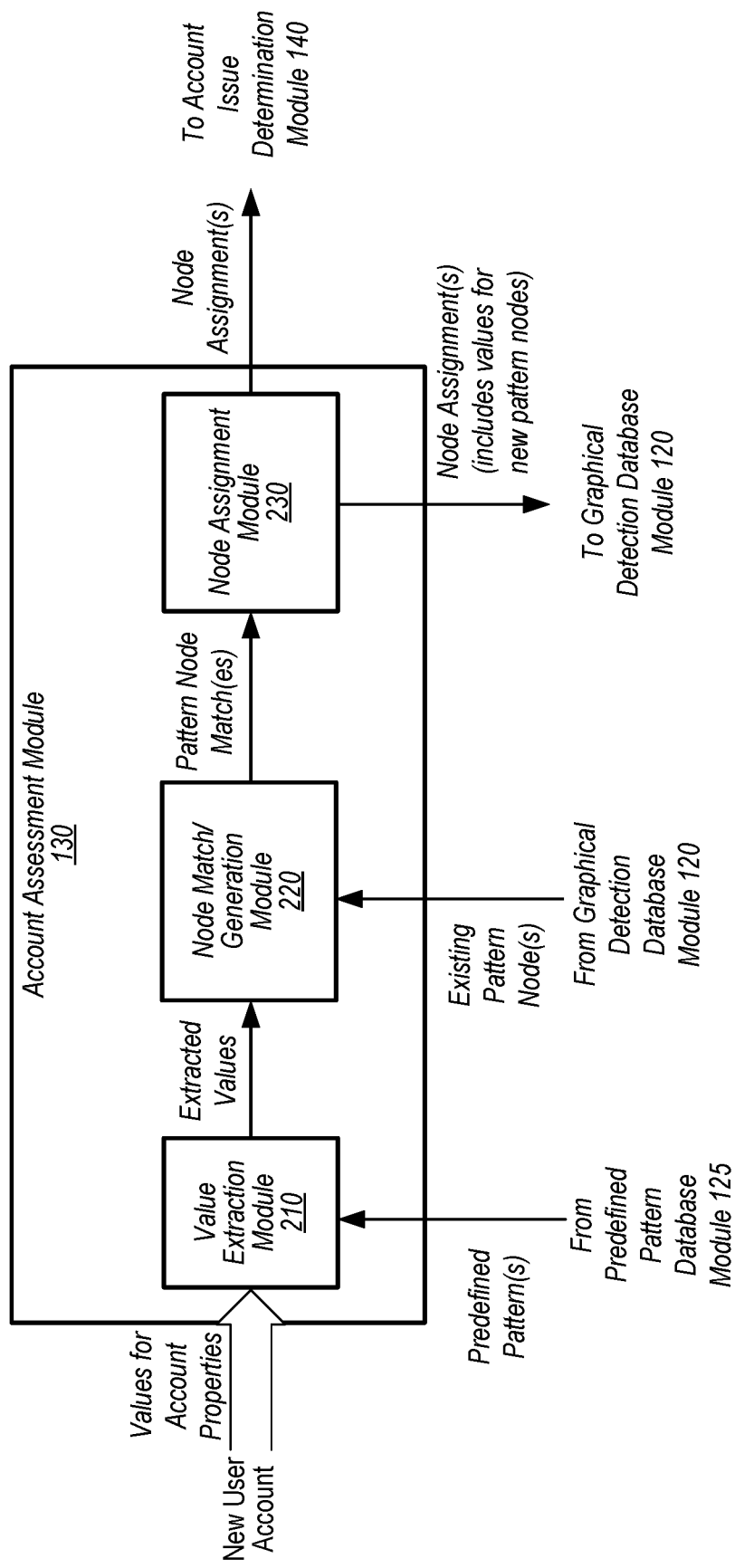
FIG. 2 is a block diagram of an account assessment module, according to some embodiments.

As shown in FIG. 1, account assessment module 130 may access predefined pattern database module 125 in response to receiving the new user account information. Account assessment module 130 may, for instance, access predefined pattern information in order to begin the account issue determination assessment of the new user account. FIG. 2 is a block diagram of account assessment module 130, according to some embodiments. In the illustrated embodiment, account assessment module 130 includes value extraction module 210, node match/generation module 220, and node assignment module 230. In various embodiments, account assessment module 130 is implemented as a graph processing service or as part of a graph processing service.

Value extraction module 210 may assess the values for account properties in the new user account and "extract" values for the account properties according to the predefined patterns (e.g., "fuzzy" patterns) stored in and accessed from predefined pattern database module 125. As used herein, a "predefined pattern" (or "fuzzy pattern") is any pattern in a combination of two or more account properties that is determined (e.g., predefined) based on existing or previously obtained information. For example, for a transaction service, previously obtained account information may be analyzed to identify common patterns in account properties between accounts that have been linked to fraudulent or malicious behavior. From these identified common patterns, predefined patterns to look for in account properties may be generated. The generated predefined patterns may then be stored in or linked to predefined pattern database module 125 and have a predefined pattern identifier associated with each predefined pattern.

Predefined patterns may include any combination of full matches of account properties, partial matches of account properties, common threads in account properties (either full or partial), or any other patterns or trends in account properties that indicate the possibility of fraudulent or malicious behavior. Predefined patterns may include any number or combination of strings (e.g., characters) to define patterns in account properties. As described above, account properties may include, but not be limited to, identification number, new user account creation time, email address, first name, last name, country, customer type, internet protocol address, phone number, zip code, and credit card information (such as credit card bin). Examples of types of predefined patterns include simple predefined pattern types such as a combination of a business name and a country for an account or a combination of a business name (e.g., customer name) and an email domain for an account. One example of a more complex predefined pattern type is a combination of customer type, country code, email domain, an email address with some random character types (e.g., gibberish characters), and an email address name header.

In certain embodiments, value extraction module 210 assesses the account properties in the new user account to extract values for all predefined patterns stored in predefined pattern database module 125. Embodiments may be contemplated where value extraction module 210 assesses the account properties in the new user account to extract values for a subset of predefined patterns stored in predefined pattern database module 125. Value extraction module 210 may extract values of the account properties in the new user account according to the predefined patterns to determine "extracted values", as shown in FIG. 2. Accordingly, the extracted values provided to node match/generation module 220 in the illustrated embodiment include account property values from the new user account extracted for each of the predefined patterns assessed by value extraction module 210. In various embodiments, a value for a predefined pattern is extracted as a string of account property values. For instance, if the predefined pattern is a business name and a country and the new user account has a business name of "ABC" and a country of "USA", value extraction module 210 may extract the string of "ABC;USA" as the extracted value for the predefined pattern.

In various embodiments, node match/generation module 220 may assess the extracted values and determine matching to pattern nodes in graphical detection database module 120 based on the extracted values. As described above, graphical detection database module 120 is a graph database storing data according to nodes and edges. In the present disclosure, nodes may include either account nodes or pattern nodes. As used herein, the term "account node" refers to a node holding values of account properties for a user account where the node has a label identifying the user account. For example, an account node may hold (e.g., store) values for a set of account properties in a user account with a label identifying the node as being associated with the user account (such as a customer identifier or user identifier).

As used herein, the term "pattern node" refers to a node holding values for a set of account properties where two or more account properties are in a predefined pattern and the node has a label identifying the predefined pattern. For example, a pattern node may hold values for a set of account properties where at least two of the account properties are in a predefined pattern accessed from predefined pattern database module 125, as described above. In various embodiments, a pattern node may be referred to as a "fuzzy node".

During initial setup of determination system 100, no pattern nodes may exist in graphical detection database module 120 as no account evaluations have been made. When no pattern nodes exist in graphical detection database module 120, there are no pattern nodes to match to when node match/generation module 220 receives the extracted values for the predefined patterns in a new user account. In these instances, node match/generation module 220 may generate new pattern nodes for graphical detection database module 120. For example, the extracted values for the predefined patterns in the new user account may be set as values for account properties in pattern nodes in graphical detection database module 120 with each predefined pattern getting a new pattern node in the graphical detection database module. The new user account may then get an account node linked to each of the new pattern nodes.

Each new pattern node may also get a label determined according to its predetermined pattern. In various embodiments, a label for a pattern node includes a pattern key (which may be referred to as a fuzzy key) associated with the predefined pattern for the pattern node. For instance, the pattern key may be a combination of the identifier for the predefined pattern (such as the predefined pattern identifier stored in predefined pattern database module 125, described above) and the values for the account properties in the predefined pattern. As an example, for the extracted value of "ABC;USA", the predefined pattern may have a predefined pattern identifier of 1 such that the pattern key may be: "1_ABC_USA". This pattern key may then be used as the label for the corresponding pattern node in graphical detection database module 120.

In some embodiments, graphical detection database module 120 may be populated with pattern nodes from previously obtained information. For example, information used to determined predefined patterns may be used to setup pattern nodes to populate graphical detection database module 120. Otherwise, graphical detection database module 120 is populated once at least one new user account is established and evaluated by determination system 100, as described above. Once graphical detection database module 120 is populated with at least one pattern node, when a new user account with account properties is received by account assessment module 130 and values for the account properties are extracted by value extraction module 210, node match/generation module 220 may determine whether the new user account belongs to a pattern node (e.g., a fuzzy node) existing in graphical detection database module 120.

As described herein, an existing pattern node holds values for account properties in the predefined pattern of the pattern node. Accordingly, a comparison of the extracted values for the same predefined pattern in the new user account to the values for the account properties in the predefined pattern of the existing pattern node by node match/generation module 220 may be used to determine whether the new user account belongs to the existing pattern node. For example, when the extracted values for the predefined pattern in the new user account match the values for the same predefined pattern of the existing pattern node, the new user account may be assigned to and belong to the existing pattern node. Subsequently, as described below, the new user account may get an account node linked to the matching pattern node. The same process may be repeated for each of the extracted values. When there is no match between an extracted value for a predefined pattern and an existing pattern node, a new pattern node may be generated, as is done during the initial setup when no pattern nodes exist described above.

Figure 3:
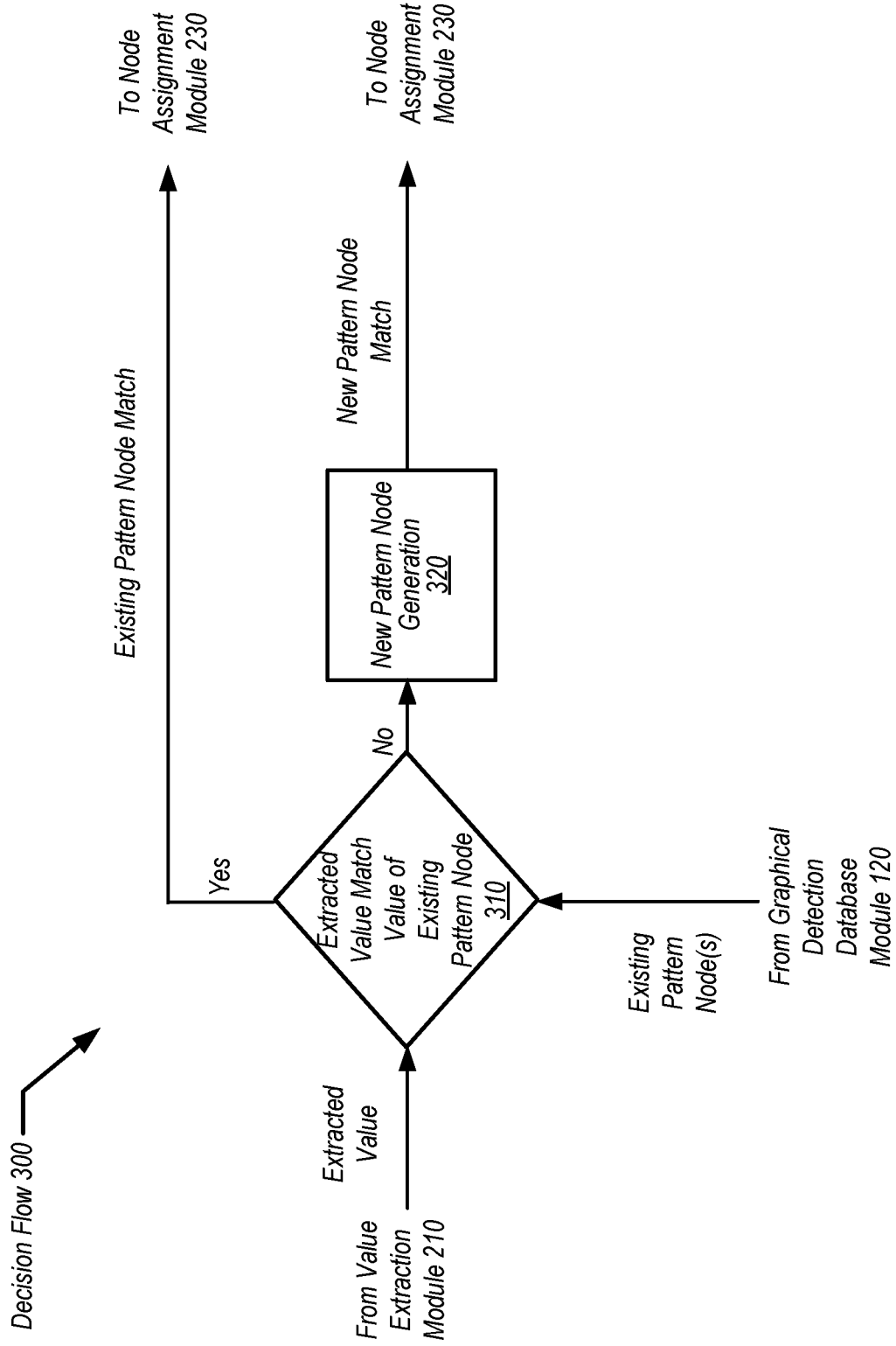
FIG. 3 depicts a flow diagram of a decision flow for a node match/generation module, according to some embodiments.

FIG. 3 depicts a flow diagram of decision flow 300 for node match/generation module 220, according to some embodiments. Decision flow 300 may be implemented to determine whether there is a match of an extracted value for a new user account to an existing pattern node or whether a new pattern node is generated. Decision flow 300 may be implemented after graphical detection database module 120 is populated with at least one pattern node, as described above.

In decision flow 300, the extracted value from value extraction module 210 is evaluated in 310 to determine whether the extracted value matches the value of the existing pattern node (e.g., whether the extracted value matches the value of the account properties in the predefined pattern of the existing pattern node). When there is a match between the extracted value and the value of the existing pattern node, the existing pattern node match is output from node match/generation module 220 to node assignment module 230. When there is not a match between the extracted value and the value of the existing pattern node, a new pattern node is generated in 320. The new pattern node match is then output from node match/generation module 220 to node assignment module 230. Decision flow 300 may be repeated for each existing pattern node to determine whether the new user account belongs to any of the existing pattern nodes in graphical detection database module 120.

It should be noted that node match/generation module 220 may use Boolean operation to determine whether the extracted value matches to the value of the existing pattern node. For example, with the extracted string value of "ABC; USA" described above, the matching decision may include attempting to match "ABC AND USA" to an existing pattern node. Other Boolean operations may also be contemplated such as "OR", "AND/OR", "NOT", "ANDNOT", etc.

Turning back to FIG. 2, in the illustrated embodiment, node/match generation module 220 outputs pattern node matches to node assignment module 230. The pattern node matches include either the existing pattern node matches or the new pattern node matches determined by decision flow 300, shown in FIG. 3. After receiving a pattern node match, node assignment module 230 assigns an account node for the new user account to all the matched pattern nodes. For example, an account node for the new user account is assigned to each of the pattern nodes that is matched to the new user account based on the extracted values, as described above. It should also be noted that, in various embodiments, a user account may be reassigned to a new account node corresponding to another pattern node if information in the user account is changed. For instance, when a user account's email address, phone number, or credit card information changes, the user account may be evaluated again by determination system 100 to determine a new account node assignment for the user account.

In certain embodiments, the node assignments are provided to graphical detection database module 120 for addition to the graph database. It should be noted that node assignments for newly generated pattern nodes are also provided to graphical detection database module 120 for addition to the graph database. Information for the newly generated pattern nodes may be included as part of the node assignments or provided when node match/generation module 220 creates the new pattern node (e.g., in 310 of decision flow 300, shown in FIG. 3).

In various embodiments, pattern nodes (whether existing or newly generated) may be given time limits for existence in graphical detection database module 120. For instance, a time-to-live (TTL) label may be placed on pattern nodes. In some contemplated embodiments, the TTL label is placed on pattern nodes to allow pattern nodes created for valid user accounts (e.g., non-fraudulent user accounts) to expire after a period of time and avoid unnecessarily occupy storage space in graphical detection database module 120. Thus, when a valid new user account is created, it may create one or more pattern nodes, but these pattern nodes will expire in a short time period (e.g., a few days) unless additional activity is detected at these pattern nodes. Pattern nodes associated with accounts having potential issues may exist for longer periods of time due to the additional activity likely to occur because of malicious behavior (e.g., multiple accounts attempted to be created using the same patterns). Combinations of multiple TTL labels may also be contemplated. Additionally, TTL labels may also be applied to account nodes created for new user accounts in addition to pattern nodes. Edges may also be subject to TTL label logic and removed according to removal of nodes associated with the edges. As another example, an account node may be removed automatically when an account is closed or otherwise removed from the system before the TTL limit is reached.

FIG. 4 depicts one example of addition of a new user account to a graph database, according to some embodiments. In the illustrated embodiment, node 400 is a node for a new user account. Pattern nodes 410A, 410B, 410C are existing pattern nodes in the graph database. Pattern nodes 410A, 410B, 410C hold values for the account properties in the predefined patterns for each node (along with other values of account properties). As shown by the edges from node 400 to pattern nodes 410A, 410B, 410C, the new user account is evaluated at each of the pattern nodes. It should be noted that node 400 and its corresponding edges may be removed from the graph database after completion of the evaluation. At pattern nodes 410A, 410B, 410C, comparison of values of account properties in the new user account associated with node 400 to values for account properties in the predefined patterns is implemented at each pattern node to determine whether node 400 belongs to any of the pattern nodes. This evaluation and comparison may be implemented according to the embodiments described in FIGS. 2 and 3 above.

In the illustrated embodiment of FIG. 4, the evaluation of node 400 determines that the new user account belongs to each of pattern nodes 410A, 410B, 410C. Thus, node assignment module 230 (described above) may assign an account node for node 400 to each of pattern nodes 410A, 410B, 410C. In various embodiments, pattern nodes 410A, 410B, 410C have existing account nodes linked to the pattern nodes. For instance, as depicted, account node 420A is linked to pattern node 410A, account node 420B is linked to pattern node 410B, and account node 420C is linked to pattern node 410C. It should be noted that only pattern nodes 410 that match node 400 for the new user account are shown and that additional pattern nodes may exist in the graph database that are not linked to node 400.

FIG. 5 depicts another example of addition of a new user account to a graph database, according to some embodiments. In the illustrated embodiment, node 500 is a node for a new user account. Pattern nodes 510A, 510B, 510C are the existing pattern nodes in the graph database. Evaluation of the values of account properties for node 500 at each of pattern nodes 510A, 510B, 510C provides a match to the new user account and thus node assignment module 230 (described above) assigns an account node for node 500 to each of pattern nodes 510A, 510B, 510C. In the illustrated embodiment of FIG. 5, only pattern nodes 510A and 510C have existing account nodes linked to the pattern nodes while pattern node 510B has no existing account nodes. Thus, pattern node 510B may be considered to be a newly generated pattern node, as described above. Further, as shown in FIG. 5, pattern node 510A has multiple existing account nodes linked—account nodes 520A, 520B, 520C— while pattern node 510C only has one existing account node linked—account node 520D.

Figure 6:
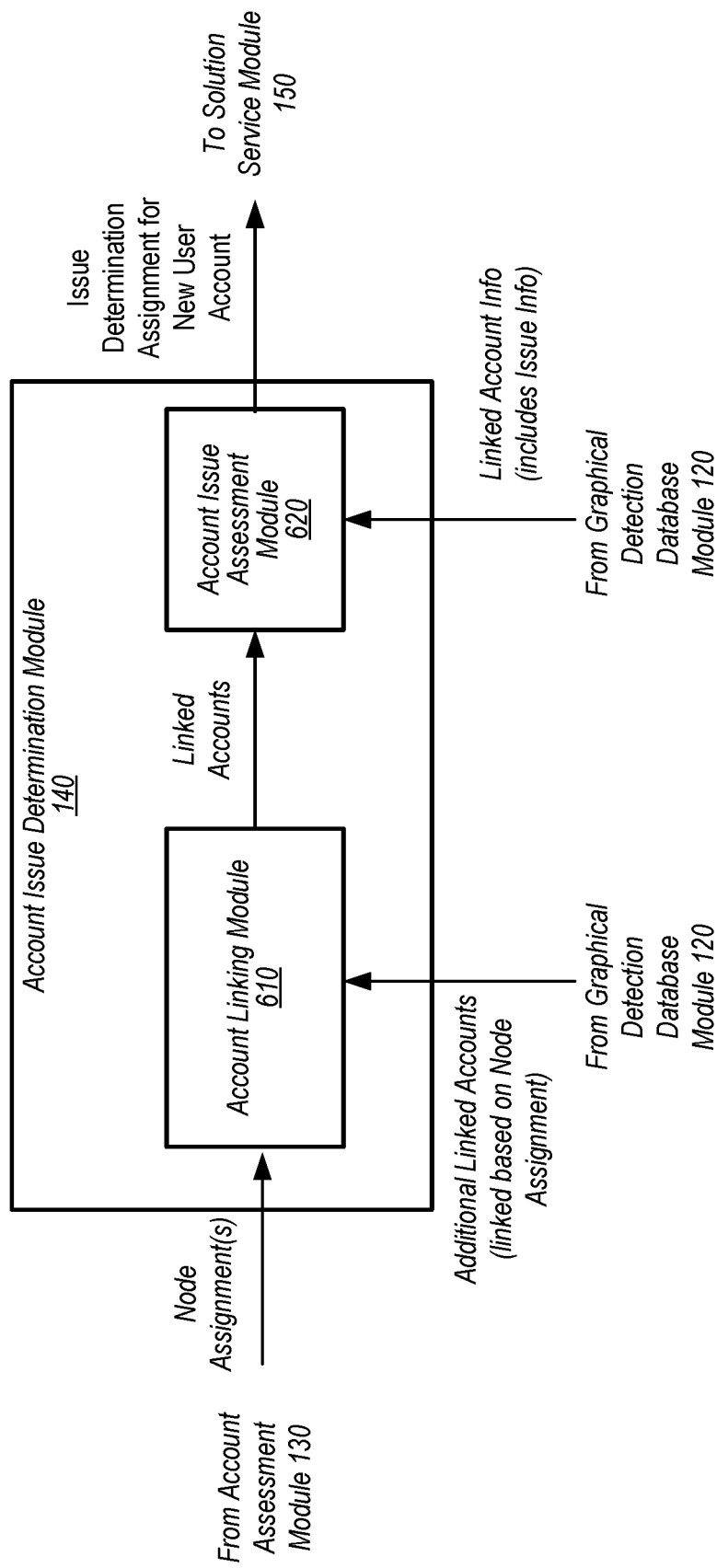
FIG. 6 is a block diagram of an account issue determination module in a potential account issue determination system, according to some embodiments.

As described above, the implementation of pattern nodes (e.g., fuzzy nodes) in the graph database provides for real-time (e.g., dynamic) detection of potential account issues (such as fraud or malicious behavior risk). For example, linking of accounts based on the fuzzy matching provided by pattern nodes in the graph database allows for recognition of linking patterns between new accounts that may otherwise go undetected. FIG. 6 is a block diagram of account issue determination module 140 in risk determination system 100, according to some embodiments. In the illustrated embodiment, account issue determination module 140 includes account linking module 610 and account issue assessment module 620.

In various embodiments, account linking module 610 receives the node assignments from account assessment module 130. The node assignments include account nodes and their links to pattern nodes, as described above. In some embodiments, these node assignments may be directly accessed from graphical detection database module 120 rather than being received from account assessment module 130. From the node assignments, account linking module 610 may determine additional accounts that are linked to the new user account (or other account that is being assessed for potential account issues). For example, in the illustration of FIG. 5, account nodes 520A, 520B, 520C may be linked to account node 500 based on the shared link of pattern node 510A.

The linked account information determined by account linking module 610 may be provided to account issue assessment module 620. Account issue assessment module 620 may access account information for the linked accounts in order to determine a potential account issue assessment for the new user account. In various embodiments, the account information for the linked accounts is held (e.g., stored) by the account nodes in graphical detection database module 120. In some embodiments, the account information for the linked accounts may be retrieved from another source (such as another database storing data for fraudulent or malicious behavior).

In certain embodiments, account issue assessment module 620 determines a potential account issue assessment (e.g., fraud risk assessment) for the new user account based on account information for the linked accounts. For instance, in fraud risk assessment, if the accounts linked to the new user account are known fraudulent accounts, the new user account may be determined to be at high risk for fraud (e.g., the new user account is assigned a high value for risk due to the fraud trend exhibited by the linked accounts). Various approaches may be implemented for determining potential account issue assessment based on linked accounts beyond the link between known fraudulent accounts and the new user account. For example, with a single pattern node, additional parameters such as, but not limited to, linked account count, bad account ratio, restricted account ratio, loss amounts, loss ratios, maximum loss ratios may be implemented to determine a potential account issue assessment for the new user account.

Aggregation over multiple pattern nodes (e.g., multiple fuzzy nodes) may also be implemented. For example, summation, determination of maximums/minimums, averages, standard deviations, etc. may be implemented over multiple pattern nodes to determine account issue assessments. Aggregations may also be made over all linked accounts across multiple pattern nodes. These aggregations may include, but not be limited to, total number of linked accounts, density of linked accounts, total number of malicious accounts, density of malicious accounts, etc.

The account issue determination assignment for the new user account may be provided to solution service module 150. Solution service module 150 may then implement various solutions according to the account issue determination associated with the new user account. For example, solution service module 150 may submit the new user account for agent review or place an automatic action (such as account restriction) on the new user account.

In some embodiments, account issue determination module 140 may provide an alert or other action in response to other parameters indicated by account assessment module 130. For example, an alert or other warning may be triggered when account assessment module 130 adds a high number of new edges (which may be due to new account nodes or new pattern nodes) over a specified time period (such as a few days). Such a spike in new activity may be indicative of malicious behavior directed at the service system.

Figure 7:
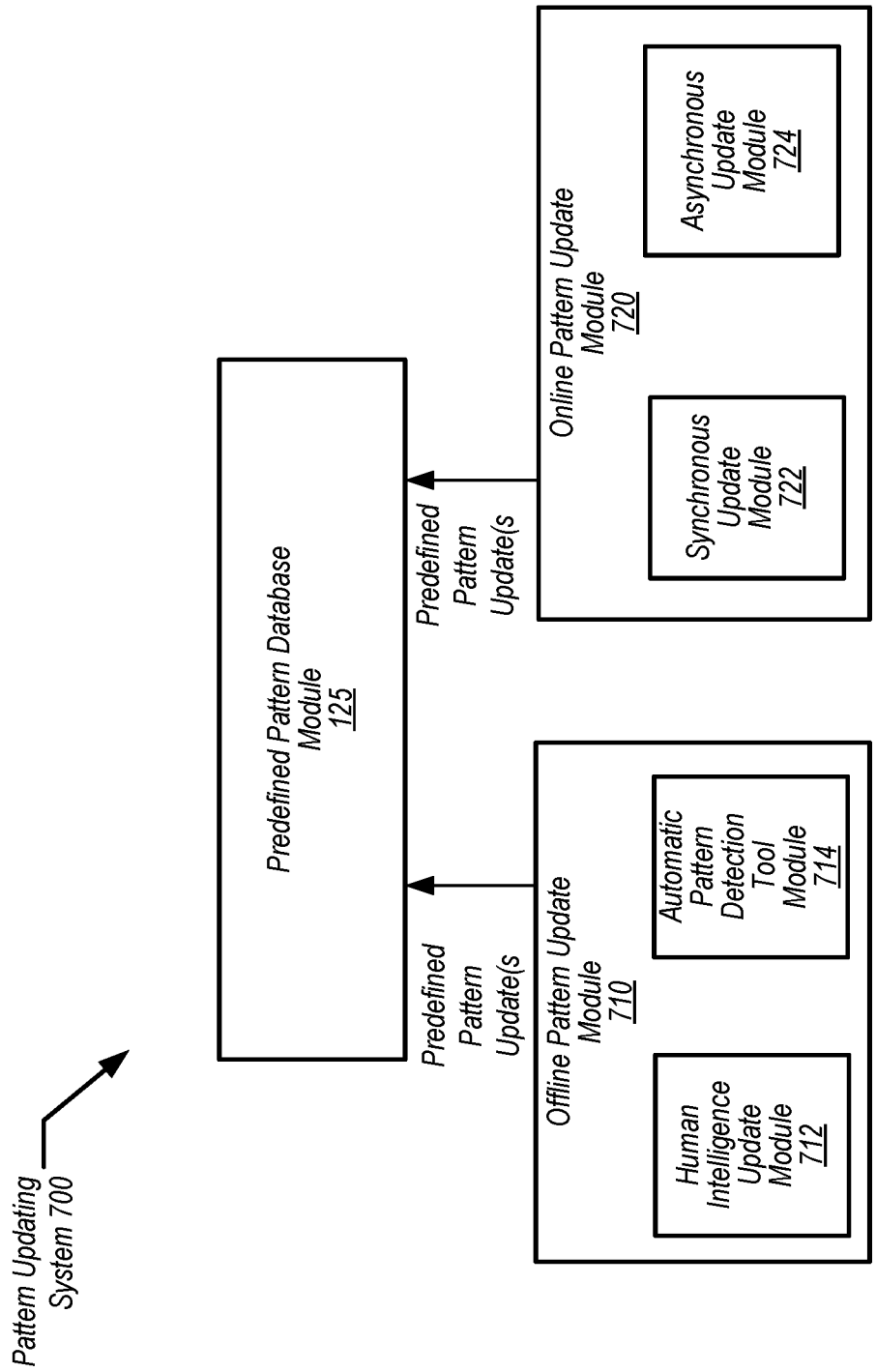
FIG. 7 is a block diagram of a pattern updating system, according to some embodiments

Various embodiments may be contemplated for updating predefined pattern database module 125, shown in FIG. 1. FIG. 7 is a block diagram of pattern updating system 700, according to some embodiments. In the illustrated embodiment, pattern updating system 700 includes offline pattern update module 710 and online pattern update module 720. Offline pattern update module 710 may include updating predefined patterns based on human intelligence (e.g., using human intelligence update module 712) or using automatic pattern detection tools (e.g., automatic pattern detection tool module 714). Human intelligence update module 712 may implement, for example, manual or computer-assisted analysis of operation of determination system 100 or other account issue assessment systems. In some embodiments, human intelligence update module 712 may include analysis of data from a data warehouse (e.g., an enterprise data warehouse) or other data storage system. The analysis made by human intelligence update module 712 may be used to make determinations of patterns in account issues or changes in patterns in account issues. In various embodiments, automatic pattern detection tool module 714 may implement artificial intelligence or other machine learning algorithms to understand patterns in account issues based on operation of determination system 100 or data from a data warehouse.

The determinations made by either human intelligence update module 712 or automatic pattern detection tool module 714 may then be implemented in generating or creating offline patterns of nodes or edges. In some embodiments, these offline patterns can be provided as predefined patterns to update predefined pattern database module 125. In some embodiments, these offline patterns can be used to update graphical detection database module 120. For instance, a graph load service or other service may be implemented to update graphical detection database module 120 on a batch loading basis (e.g., a daily or weekly basis).

In the illustrated embodiment, online pattern update module 720 includes synchronous update module 722 and asynchronous update module 724. Both synchronous update module 722 and asynchronous update module 724 may analyze changes in the graph database stored in graphical detection database module 120 to determine updates to predefined patterns for predefined pattern database module 125. For instance, these tools may assess the addition or removal of pattern nodes and account nodes in response to events (such as new user account additions) in order to make adjustments to the predefined patterns based on changes in behavior over time. In some embodiments, synchronous update module 722 implements a rapid update cycle for updating predefined pattern database module 125 in sync with operation of determination system 100. For example, synchronous update module 722 may access information on a new pattern node (e.g., fuzzy node) created by determination system 100 and synchronously determine and provide an updated predefined pattern to predefined pattern database module 125. Asynchronous update module 724 may update predefined pattern database module 125 asynchronously by accessing information on new pattern nodes (e.g., fuzzy nodes) created by determination system 100, computing logic for predefined patterns separately, and then updating the predefined pattern database module. In some embodiments, asynchronous update module 724 may update predefined pattern database module 125 on a batch upload basis (e.g., daily or weekly).

Example Methods

Figure 8:
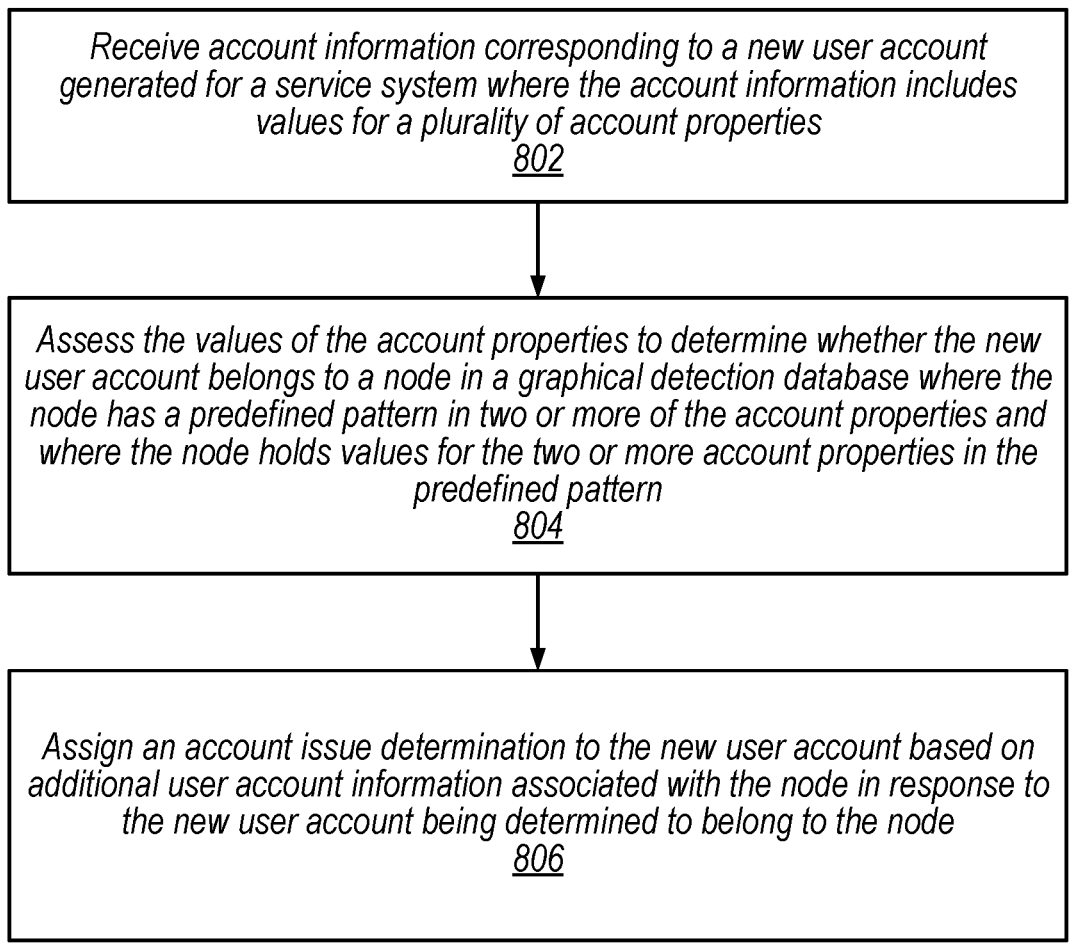
FIG. 8 is a flow diagram illustrating a method for determining a potential account issue assessment, according to some embodiments.

FIG. 8 is a flow diagram illustrating a method for determining a potential account issue assessment, according to some embodiments. The method shown in FIG. 8 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In various embodiments, some or all elements of this method may be performed by a particular computer system, such as computing device 910, described below.

At 802, in the illustrated embodiment, a computer system receives account information corresponding to a new user account generated for a service system where the account information includes values for a plurality of account properties.

At 804, in the illustrated embodiment, the computer system assesses the values of the account properties to determine whether the new user account belongs to a node in a graphical detection database where the node has a predefined pattern in two or more of the account properties and where the node holds values for the two or more account properties in the predefined pattern. In some embodiments, determining whether the new user account belongs to the node includes determining whether, for the two or more account properties in the predefined pattern, the values of the two or more account properties in the new user account match the values of the two or more account properties in the node.

At 806, in the illustrated embodiment, the computer system assigns an account issue determination to the new user account based on additional user account information associated with the node in response to the new user account being determined to belong to the node.

In some embodiments, the new user account is assigned to an account node in the graphical detection database that branches from the node in response to the new user account being determined to belong to the node.

Example Computer System

Figure 9:
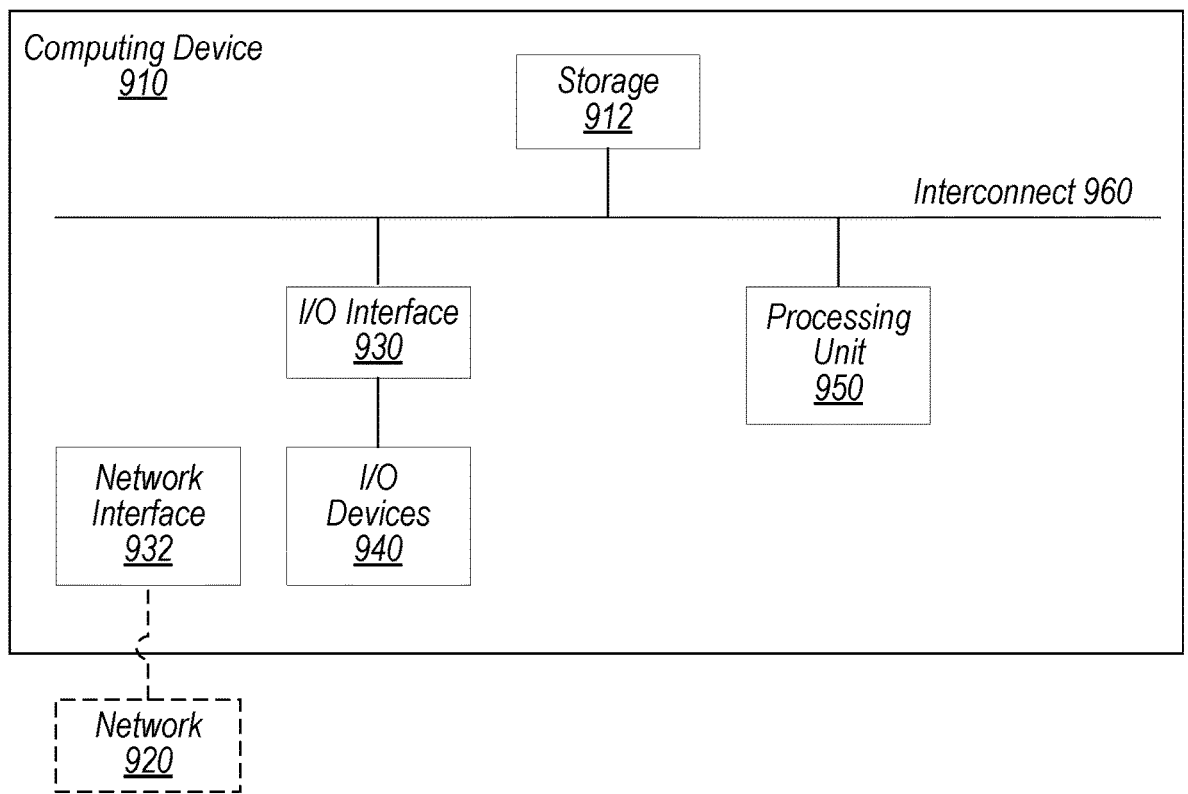
FIG. 9 is a block diagram of one embodiment of a computer system.

Turning now to FIG. 9, a block diagram of one embodiment of computing device (which may also be referred to as a computing system) 910 is depicted. Computing device 910 may be used to implement various portions of this disclosure. Computing device 910 may be any suitable type of device, including, but not limited to, a personal computer system, desktop computer, laptop or notebook computer, mainframe computer system, web server, workstation, or network computer. As shown, computing device 910 includes processing unit 950, storage 912, and input/output (I/O) interface 930 coupled via an interconnect 960 (e.g., a system bus). I/O interface 930 may be coupled to one or more I/O devices 940. Computing device 910 further includes network interface 932, which may be coupled to network 920 for communications with, for example, other computing devices.

In various embodiments, processing unit 950 includes one or more processors. In some embodiments, processing unit 950 includes one or more coprocessor units. In some embodiments, multiple instances of processing unit 950 may be coupled to interconnect 960. Processing unit 950 (or each processor within 950) may contain a cache or other form of on-board memory. In some embodiments, processing unit 950 may be implemented as a general-purpose processing unit, and in other embodiments it may be implemented as a special purpose processing unit (e.g., an ASIC). In general, computing device 910 is not limited to any particular type of processing unit or processor subsystem.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Storage 912 is usable by processing unit 950 (e.g., to store instructions executable by and data used by processing unit 950). Storage 912 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage 912 may consist solely of volatile memory, in one embodiment. Storage 912 may store program instructions executable by computing device 910 using processing unit 950, including program instructions executable to cause computing device 910 to implement the various techniques disclosed herein.

I/O interface 930 may represent one or more interfaces and may be any of various types of interfaces configured to couple to and communicate with other devices, according to various embodiments. In one embodiment, I/O interface 930 is a bridge chip from a front-side to one or more back-side buses. I/O interface 930 may be coupled to one or more I/O devices 940 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   receiving, by a computer system, account information corresponding to a new user account generated for a service system, wherein the account information includes values for a plurality of account properties;
   determining whether the new user account belongs to a node in a graphical detection database, wherein the node is associated with a predefined pattern in two or more of the account properties, wherein the predefined pattern includes a combination of characters from the two or more account properties, the node holding existing values for the two or more account properties based on the predefined pattern, wherein the existing values held by the node for the two or more account properties based on the predefined pattern include existing values for the combination of characters, and wherein determining whether the new user account belongs to the node includes:
      extracting values for the two or more account properties from the new user account based on the predefined pattern, wherein the extracted values for the two or more account properties from the new user account based on the predefined pattern include extracted values for the combination of characters; and
      determining the new user account belongs to the node when the extracted values of the two or more account properties corresponding to the new user account match the existing values for the two or more account properties held in the node, wherein the extracted values of the two or more account properties corresponding to the new user account match the existing values for the two or more account properties held in the node when the extracted values for the combination of characters match the existing values for the combination of characters; and
   assigning an account issue determination to the new user account based on additional user account information associated with the node in response to the new user account being determined to belong to the node.

2. The method of claim 1, wherein the existing values for the two or more account properties based on the predefined pattern include a first existing value for a first account property of the two or more of the account properties and a second existing value for a second account property of the two or more of the account properties.

3. The method of claim 1, further comprising assigning the new user account to an account node in the graphical detection database that branches from the node in response to the new user account being determined to belong to the node.

4. The method of claim 3, wherein the additional user account information is associated with additional account nodes in the graphical detection database that branch from the node.

5. The method of claim 1, wherein the graphical detection database includes at least one additional node, the at least one additional node is associated with an additional predefined pattern in two or more of the account properties, the method further comprising determining whether the new user account belongs to the at least one additional node.

6. The method of claim 5, wherein determining whether the new user account belongs to the at least one additional node includes:
   extracting values for the two or more account properties from the new user account based on the additional predefined pattern; and
   determining the new user account belongs to the at least one additional node when the extracted values of the two or more account properties corresponding to the new user account match the existing values for the two or more account properties held in the at least one additional node.

7. The method of claim 1, wherein the account issue determination assigned to the new user account is an increased risk for fraud when the additional user account information associated with the node includes information indicative of known fraud.

8. The method of claim 1, further comprising providing the account information for the new user account to a solution service configured to resolve the account issue determination assigned to the new user account, wherein the solution service is one of a fraud risk solution service, a collusion detection service, or a dispute resolution service.

9. A non-transitory computer-readable medium having instructions stored thereon that are executable by a computing device to perform operations, comprising:
   receiving account information corresponding to a new user account generated for a service system, wherein the account information includes values for a plurality of account properties;
   determining whether the new user account belongs to one or more pattern nodes in a graphical detection database, wherein the pattern nodes in the graphical detection database are associated with predefined patterns in the account properties, wherein the predefined patterns include combinations of characters from the account properties, and wherein the pattern nodes hold existing values for the account properties based on the predefined patterns, wherein the existing values held by the pattern nodes for the account properties based on the predefined patterns include existing values for the combinations of characters, and wherein determining whether the new user account belongs to a specified pattern node includes:

extracting values for the account properties from the new user account based on a predefined pattern for the specified pattern node, wherein the extracted values for the account properties from the new user account based on the predefined pattern for the specified pattern node include extracted values for a combination of characters for the specified pattern node; and determining the new user account belongs to the specified pattern node when the extracted values of the account properties corresponding to the new user account match the existing values for the properties held in the specified pattern node, wherein the extracted values of the account properties corresponding to the new user account match the existing values for the account properties held in the specified pattern node when the extracted values for the combination of characters match the existing values for the combination of characters in the specified pattern node; and assigning the new user account to an account node linked to the specified pattern node in response to the new user account being determined to belong to the specified pattern node.

10. The non-transitory computer-readable medium of claim 9, wherein at least two pattern nodes in the graphical detection database have different predefined patterns.

11. The non-transitory computer-readable medium of claim 9, wherein a first pattern node holds existing values for a first set of two or more account properties in a first predefined pattern associated with the first pattern node, and wherein a second pattern node holds existing values for a second set of two or more account properties in a second predefined pattern associated with the second pattern node.

12. The non-transitory computer-readable medium of claim 9, wherein a first pattern node holds first existing values for two or more account properties based on a predefined pattern, and wherein a second pattern node holds second existing values for the two or more account properties based on the predefined pattern, the first values being different than the second values.

13. The non-transitory computer-readable medium of claim 9, wherein information for additional user accounts associated with additional account nodes linked to the specified pattern node includes indicators for known fraud by the additional user accounts, the operations further comprising assigning an increased fraud risk designation to the new user account based on the account node for the new user account belonging to the specified pattern node.

14. The non-transitory computer-readable medium of claim 9, the operations further comprising assigning the new user account to at least one additional account node linked to at least one additional pattern node in response to the new user account being determined to belong to the at least one additional pattern node.

15. The non-transitory computer-readable medium of claim 14, the operations further comprising assigning a fraud risk determination to the new user account based on aggregation of information for additional user accounts associated with additional account nodes linked to the at least one pattern node and information for additional user accounts associated with additional account nodes linked to the at least one additional pattern node.

16. A method, comprising:
receiving, by a computer system, account information corresponding to a new user account generated for a service system, wherein the account information includes values for a plurality of account properties;

generating an account node for the new user account in a graphical detection database;

determining whether the new user account belongs to a first pattern node in the graphical detection database, wherein the first pattern node is associated with a predefined pattern in two or more of the account properties, wherein the predefined pattern includes a combination of characters from the two or more account properties, and wherein the first pattern node holds existing values for the two or more account properties based on the predefined pattern, wherein the existing values held by the first pattern node for the two or more account properties based on the predefined pattern include existing values for the combination of characters, wherein the determining includes comparing, for the two or more account properties based on the predefined pattern, first values of the two or more account properties found in the new user account to the existing values of the two or more account properties held in the first pattern node, wherein the first values for the two or more account properties from the new user account based on the predefined pattern include first values for the combination of characters;

in response to the first values of the two or more account properties in the new user account being determined to match the existing values of the two or more account properties held in the first pattern node, linking the account node to the first pattern node, wherein the first values of the two or more account properties corresponding to the new user account match the existing values for the two or more account properties held in the first pattern node when the first values for the combination of characters match the existing values for the combination of characters; and in response to the first values of the two or more account properties in the new user account being determined to not match the existing values of the two or more account properties held in the first pattern node:
generating a second pattern node in the graphical detection database, wherein the second pattern node holds the first values of the two or more account properties in the new user account; and
linking the account node to the second pattern node.

17. The method of claim 16, further comprising:
receiving, by the computer system, second account information corresponding to a second new user account generated for the service system, wherein the second account information includes values for a plurality of account properties;

generating a second account node for the second new user account in the graphical detection database;

determining whether the second new user account belongs to the first pattern node in the graphical detection database by comparing, for the two or more account properties based on the predefined pattern, second values of the two or more account properties found in the second new user account to the existing values of the two or more account properties held in the first pattern node; and determining whether the second new user account belongs to the second pattern node in the graphical detection database by comparing, for the two or more account properties based on the predefined pattern, the second values of the two or more account properties found in the second new user account to the first values of the two or more account properties held in the second pattern node.

18. The method of claim 16, wherein the second pattern node is associated with the predefined pattern in the two or more of the account properties.

\* \* \* \* \*